(12) United States Patent
Mercer et al.

(10) Patent No.: US 10,980,170 B2
(45) Date of Patent: Apr. 20, 2021

(54) PIEZO ACTUATED NOZZLE CONTROL VALVE

(71) Applicant: Deere & Company, Moline, IL (US)

(72) Inventors: David S. Mercer, W. Des Moines, IA (US); Richard A. Humpal, Ankeny, IA (US)

(73) Assignee: Deere & Company, Moline, IL (US)

(*) Notice: Subject to any disclaimer, the term of this patent is extended or adjusted under 35 U.S.C. 154(b) by 130 days.

(21) Appl. No.: 16/145,691

(22) Filed: Sep. 28, 2018

(65) Prior Publication Data

US 2019/0166757 A1 Jun. 6, 2019

Related U.S. Application Data

(60) Provisional application No. 62/593,458, filed on Dec. 1, 2017.

(51) Int. Cl.
| | |
|---|---|
| *A01C 23/00* | (2006.01) |
| *A01C 23/04* | (2006.01) |
| *A01M 7/00* | (2006.01) |
| *A01M 21/04* | (2006.01) |
| *A01C 7/06* | (2006.01) |
| *A01C 23/02* | (2006.01) |

(52) U.S. Cl.
CPC .......... *A01C 23/007* (2013.01); *A01C 23/047* (2013.01); *A01M 7/0042* (2013.01); *A01M 7/0082* (2013.01); *A01M 7/0089* (2013.01); *A01M 21/043* (2013.01); *A01C 7/06* (2013.01); *A01C 23/023* (2013.01)

(58) Field of Classification Search
CPC ....... A01C 23/007; A01C 23/047; A01C 7/06; A01C 23/023; A01M 7/0042; A01M 7/0082; A01M 7/0089; A01M 21/043
USPC ....... 239/69, 71, 74, 102.1, 102.2, 172, 562, 239/159–170, 550
See application file for complete search history.

(56) References Cited

U.S. PATENT DOCUMENTS

| | | |
|---|---|---|
| 5,310,113 A | 5/1994 | Cowgur |
| 5,911,362 A * | 6/1999 | Wood .................. A01M 7/0089 239/71 |
| 10,076,088 B2 | 9/2018 | Schmidt |
| 2006/0261188 A1* | 11/2006 | Ito .......................... A01M 1/02 239/304 |
| 2013/0233940 A1 | 9/2013 | Ballu |

FOREIGN PATENT DOCUMENTS

CN 103507800 A 1/2014

OTHER PUBLICATIONS

European Search Report issued in counterpart application No. 18206566.4 dated Apr. 10, 2019. (7 pages).

* cited by examiner

*Primary Examiner* — Steven J Ganey
(74) *Attorney, Agent, or Firm* — Joseph R. Kelly; Kelly, Holt & Christenson, PLLC

(57) ABSTRACT

A mobile agricultural application machine includes a controllable valve and nozzle through which a substance is applied to an agricultural field. The controllable valve is a piezo-actuated valve. An application control system generates valve control signals to control a piezo actuator on the piezo-actuated valve.

21 Claims, 6 Drawing Sheets

PIEZO ACTUATED NOZZLE CONTROL VALVE

CROSS-REFERENCE TO RELATED APPLICATION

The present application is based on and claims the benefit of U.S. provisional patent application Ser. No. 62/593,458, filed Dec. 1, 2017, the content of which is hereby incorporated by reference in its entirety.

FIELD OF THE DESCRIPTION

The present description relates to applying a substance to an agricultural field. More specifically, the present description relates to a piezo actuated nozzle control valve for controlling the application of the substance to the agricultural field.

BACKGROUND

There are a wide variety of different types of agricultural vehicles that apply a substance to an agricultural field. Such agricultural vehicles can include such things as sprayers, planters, or other vehicles.

An agricultural sprayer, for instance, often carries a substance to be applied to a field. A boom has a plurality of controllable spray nozzles mounted thereon. The substance to be sprayed is pumped to the nozzles, along the boom, where it is sprayed or otherwise applied to the field. The substance to be applied to the field can be liquid, particulate, or another type of substance.

Some planters also carry a substance to be applied to the field, in addition to seed that is planted. For instance, the substance to be applied may be fertilizer, or another substance that is applied as seeds are planted.

The valves on such vehicles or machines often use solenoids to open and close the valve. Solenoids are relatively high power consumption devices. They can also be relatively slow. For instance, it may take on the order of 6-10 milliseconds to open a solenoid valve and 7-10 milliseconds to close it. Similarly, solenoid valves are often open/close valves. This means that it can be difficult to control the valve position and to hold it in any position between full open and full closed.

The discussion above is merely provided for general background information and is not intended to be used as an aid in determining the scope of the claimed subject matter.

SUMMARY

A mobile agricultural application machine includes a controllable valve and nozzle through which a substance is applied to an agricultural field. The controllable valve is a piezo-actuated valve. An application control system generates valve control signals to control a piezo actuator on the piezo-actuated valve.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
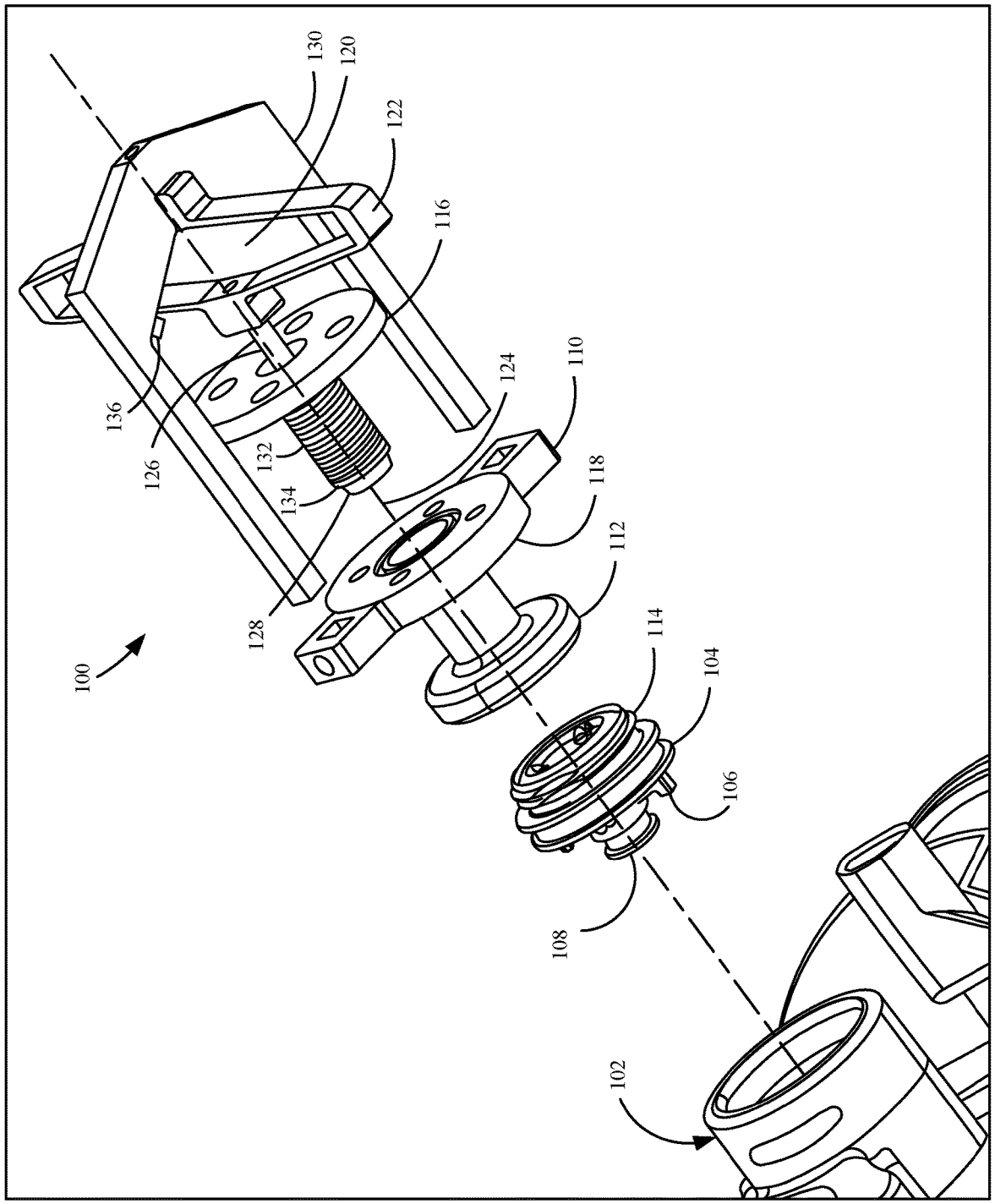
FIG. 1 is an exploded view of on example of a piezo-actuated valve assembly that can be used on a mobile agricultural application machine.

FIG. 1 is an exploded view of a portion of a piezo-actuated valve assembly 100 that can be carried by a nozzle assembly 102. The nozzle assembly 102 can be supported on a mobile agricultural application machine (such as on the boom of a sprayer, on a planter, etc.). In the example shown in FIG. 1, assembly 100 includes valve housing 104 that has an inlet 106 (that receives the substance to be applied, under pressure) and an outlet 108. Mount housing 110 has a first mounting plate 112 and a second mounting plate 118. Assembly 100 also includes plunger 126, bellows 132, plunger mounting plate 116, flexure 122, flexure mounting bracket 130 and sensor 136.

The valve housing 104 is illustratively mounted to mount housing 110 such that the first mounting plate 112 fits over, and receives, a first end 114 of valve housing 104. Plunger mounting plate 116 is also illustratively mounted to the second mounting plate 118 so that a piezo actuator (not shown) illustratively sits in a void 120 of flexure 122. The flexure 122 moves axially along an axis 124 to drive plunger 126, also in the axial direction. As plunger 126 moves in the axial direction, it causes movement of plunger tip 128 into, and out of, valve housing 104, to control the flow of fluid between inlet 106 and outlet 108.

Mounting bracket 130 is fixedly attached to the second mounting plate 118 so that, when flexure 122 moves axially, it drives plunger 126, and tip 128, into and out of valve housing 104. Also, in the example illustrated in FIG. 1, plunger 126 is a "dry plunger". Bellows 132 is fixedly attached (e.g., welded) to valve tip 128 generally at junction 134. It is also illustratively fixedly attached to mounting plate 116. Therefore, as plunger 126, and tip 128, move in the axial direction, bellows 132 expands and contracts in the axial direction (in an accordion-like manner) to accommodate that movement, but to keep plunger 126 dry (out of contact with the substance being applied through valve housing 104).

As plunger 126 moves in the axial direction, the tip 128 moves between a closed position, where it closes the passage between inlet 106 and outlet 108, and an open position, where it opens that passage. In one example, and as is described in more detail below, the position of plunger 126 and thus tip 128, can be tightly controlled to control the flow or pressure through valve housing 104. Also, because flexure 122 is driven by a piezo actuator, plunger 126 can be driven between the open and closed positions very quickly. For instance, it can be driven between those positions at a rate of approximately 30-60 Hz, or faster. This is on the order of twice as fast as a solenoid valve.

FIG. 1 also illustrates that, in one example, mounting bracket 130 can have sensor 136 (which can be an optical sensor or another sensor) disposed thereon. Sensor 136 is configured to illustratively sense the deflection of flexure 122 in the axial direction. Alternatively, it can be configured to sense the position of the piezo stack that resides in void 122.

Figure 2:
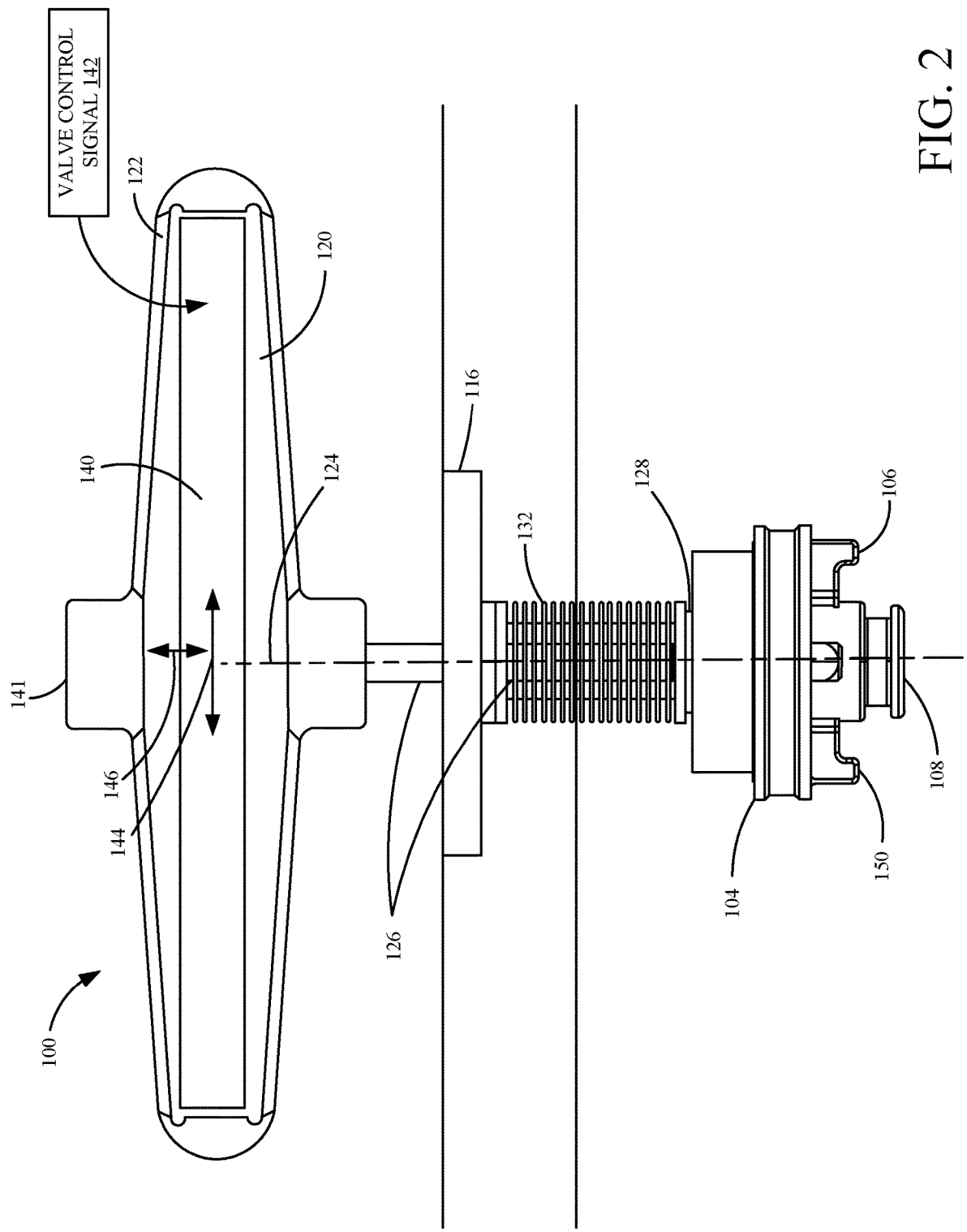
FIG. 2 is a pictorial illustration of one example of the piezo-actuated valve assembly.

FIG. 2 is a pictorial illustration of a portion of valve assembly 100 (with mounting plate 110 and mounting bracket 130 removed for the sake of clarity). The items that are similar to those shown in FIG. 1 are similarly numbered.

FIG. 2 also schematically illustrates piezo stack 140, positioned within the void 120 in flexure 122. The piezo stack 140 is illustratively driven by one or more valve control signals 142. The valve control signals 142 are applied to piezo stack 140 so that it expands and contracts generally in the direction indicated by arrow 144. This causes flexure 122 to deflect axially, generally in the direction indicated by arrow 146, along axis 124. For instance, as piezo stack 140 expands outwardly, this causes flexure 122 to contract in the axial direction (along axis 124). However, as piezo stack 140 is controlled to contract along the axis indicated by arrow 144, this causes flexure 122 to expand in the axial direction. Because the end 141 of flexure 122 is fixed relative to valve housing 104 (by mounting bracket 130 and mount housing 110 shown in FIG. 1) expansion and contraction of flexure 122 in the axial direction causes reciprocating movement of plunger 126, and plunger tip 128 relative to valve housing 104. Bellows 132 acts as an accordion (and it can be formed of electrically formed steel or another material) so that none of the substance being applied through valve housing 104 comes into contact with plunger 126.

FIG. 2 also shows another example in which an additional inlet 150 is provided on valve housing 104. Housing 104 can be formed so that the tip 128 of plunger 126 can be moved between different positions. For example, in a first position, the valve is completely closed and no substance exits through outlet 108. In a second position, only solution from inlet 106 is provided to outlet 108. In a third position, only solution from inlet 150 is provided to outlet 108, and in a fourth position, the substance from both inlets 106 and 150 can be provided to outlet 108. Any or all of these configurations are contemplated herein. In this way, piezo stack 140 can be controlled so that two different substances can be applied, at different rates, using the single valve housing 104.

Figure 3:
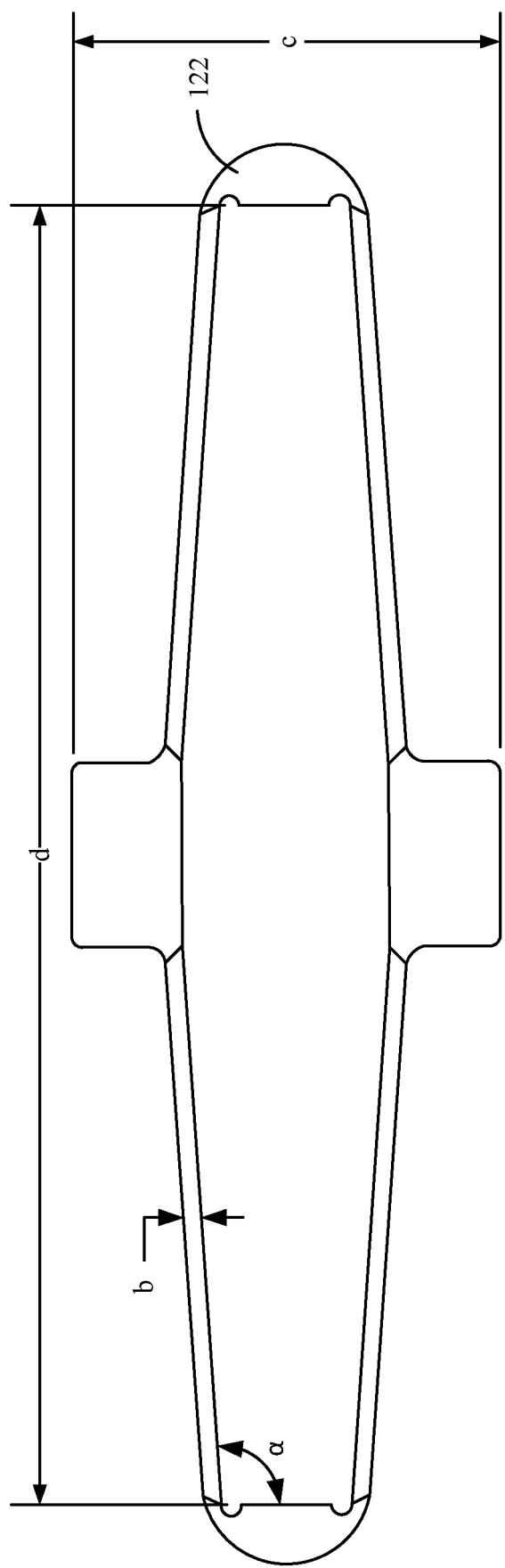
FIG. 3 is a side view of one example of a flexure.
Figure 4:
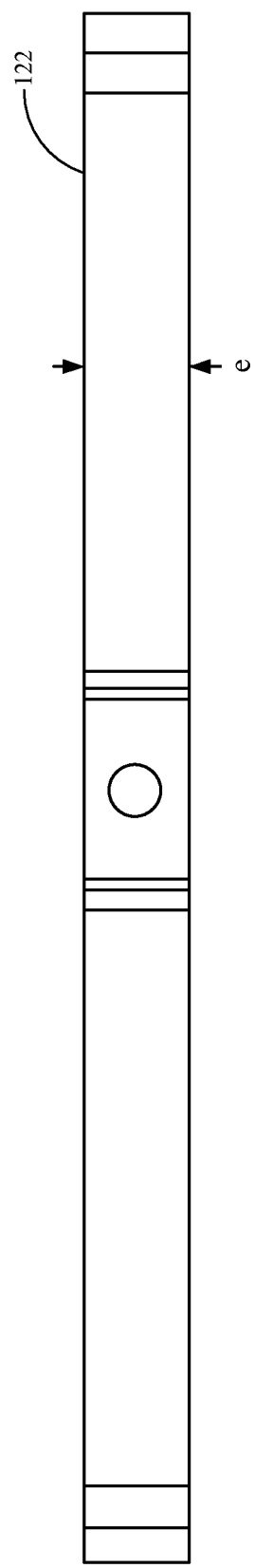
FIG. 4 is a top view of the flexure illustrated in FIG. 3.

FIGS. 3 and 4 show various geometries for flexure 122. In one example, it will be noted that flexure 122 can be configured to amplify the movement of piezo stack 140. For instance, movement of piezo stack 140 by a first amount, in the direction indicated by arrow 144 may be amplified so that it results in greater movement of flexure 122 in the direction indicated by arrow 146. For example, in one configuration, displacement or movement of piezo stack 140, in the direction indicated by arrow 144 of approximately 90-100 micrometers results in axial displacement or movement of flexure 122, in the direction indicated by arrow 146, of 0.8-1.2 millimeters. In such a configuration, the angle alpha of flexure 122 may be approximately 94°. The thickness b of flexure 122 may be approximately 1 millimeter, and the distance c may be approximately 23.24 millimeters. The measurement d may be 70.5 millimeters and the distance e (in FIG. 4) may be approximately 5 millimeters. The tolerances on the various measurements shown in FIGS. 3 and 4 may be +/−1.0 millimeters and/or +/−0.1°. It will be noted that the geometry of the flexure 122 shown in FIGS. 3 and 4 is only one example, and others may be used as well, depending on the application, the desired valve response times, etc.

Figure 5:
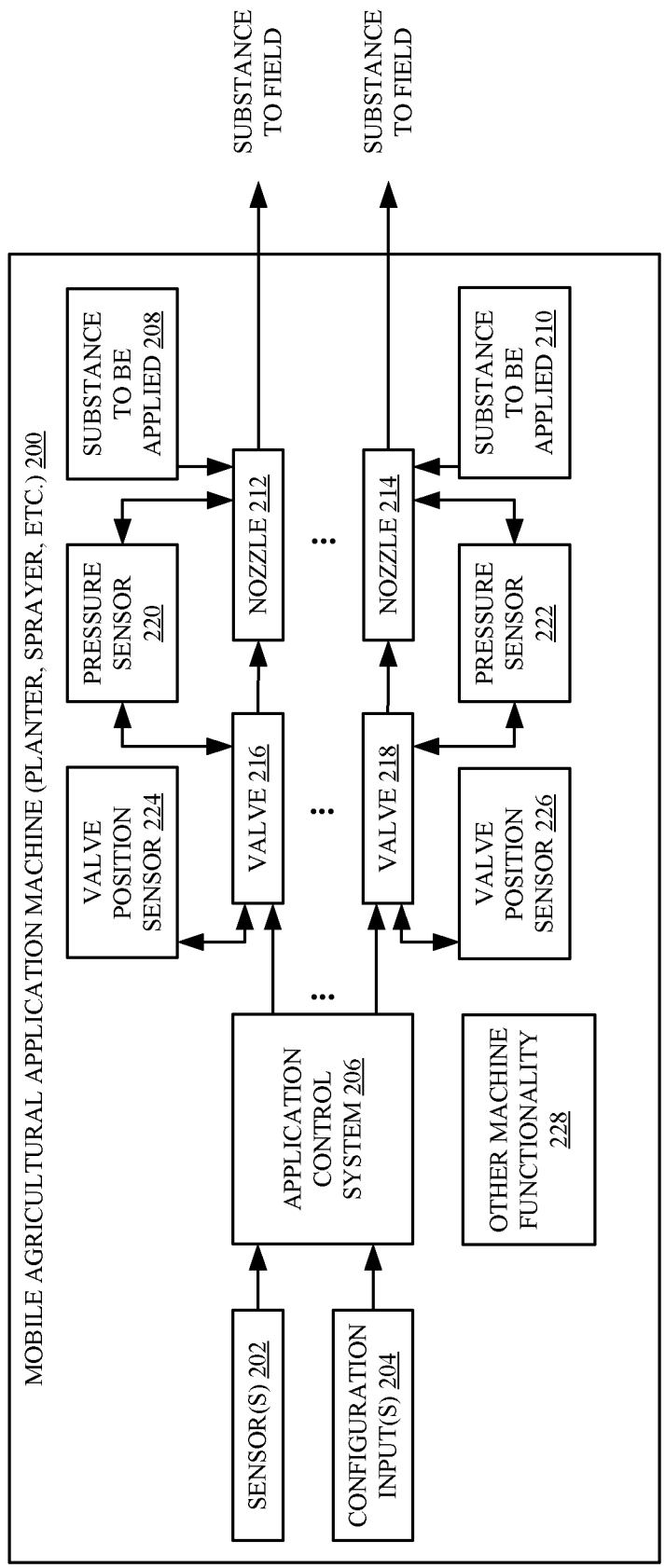
FIG. 5 is a block diagram showing one example of a mobile agricultural application machine.

FIG. 5 is a block diagram showing one example of a mobile agricultural application machine 200 that can use the valve assembly 100 illustrated above in FIGS. 1-4. In the example shown in FIG. 5, mobile agricultural application machine 200 (machine 200) may be an agricultural planter, an agricultural sprayer, etc. In the example illustrated, machine 200 can include one or more sensors 202, a set of configuration inputs 204, application control system 206, one or more sources of substance to be applied 208-210, nozzles 212-214 through which the substance is applied to the agricultural field, corresponding valves 216-218 which control the application of the substance to be applied through nozzles 212 and 214, respectively. Machine 200 can also include one or more pressure sensors 220-222 which sense the pressure drop across valves 216-218 or across the nozzles or the pressure on the inlet or outlet end of the valves or nozzles, respectively, and valve position sensors 224-226 which sense the position of valves 216-218, respectively. In one example, the valve position sensors 224-226 can be similar to sensor 136 described above with respect to FIG. 1. They can be different sensors as well.

FIG. 5 also shows that, in one example, machine 200 can include a wide variety of other machine functionality 228. Functionality 228 can include such things as operator input mechanisms and functionality so that machine 200 can be operated by an operator, a propulsion system, a steering system, various power sources and power systems, various different actuators, pumps, etc. It can also include a wide variety of other functionality as well.

Sensors 202 can sense a wide variety of things, such as soil conditions, machine speed, machine travel direction, machine position, machine orientation, weather conditions, machine settings, machine operating conditions or parameters, etc. Configuration inputs 204 can include operator inputs that are used to set the application rate or pressure for the material to be applied to the agricultural field. They can also be automatically generated inputs that are generated based on control algorithms or other items to control application control system 206.

In the example illustrated in FIG. 5, application control system 206 receives various inputs and generates valve control signals that are output to control valves 216-218. The valves control the flow of the substance to be applied 208-210 through nozzles 212-214. Pressure sensors 220 and 222 can also provide pressure signals back to application control system 206 so that application control system 206 can generate the valve control signals so that valves 216-218 are controlled based upon the pressure drop across those valves (or across the entire valve/nozzle assembly). Valve position sensors 224-226 can also generate position signals and provide those signals to application control system 206. In this way, application control system 206 can control the position of the plungers within valves 216-218, based on any of a wide variety of criteria, such as pressure, flow, application rate, etc.

Figure 6:
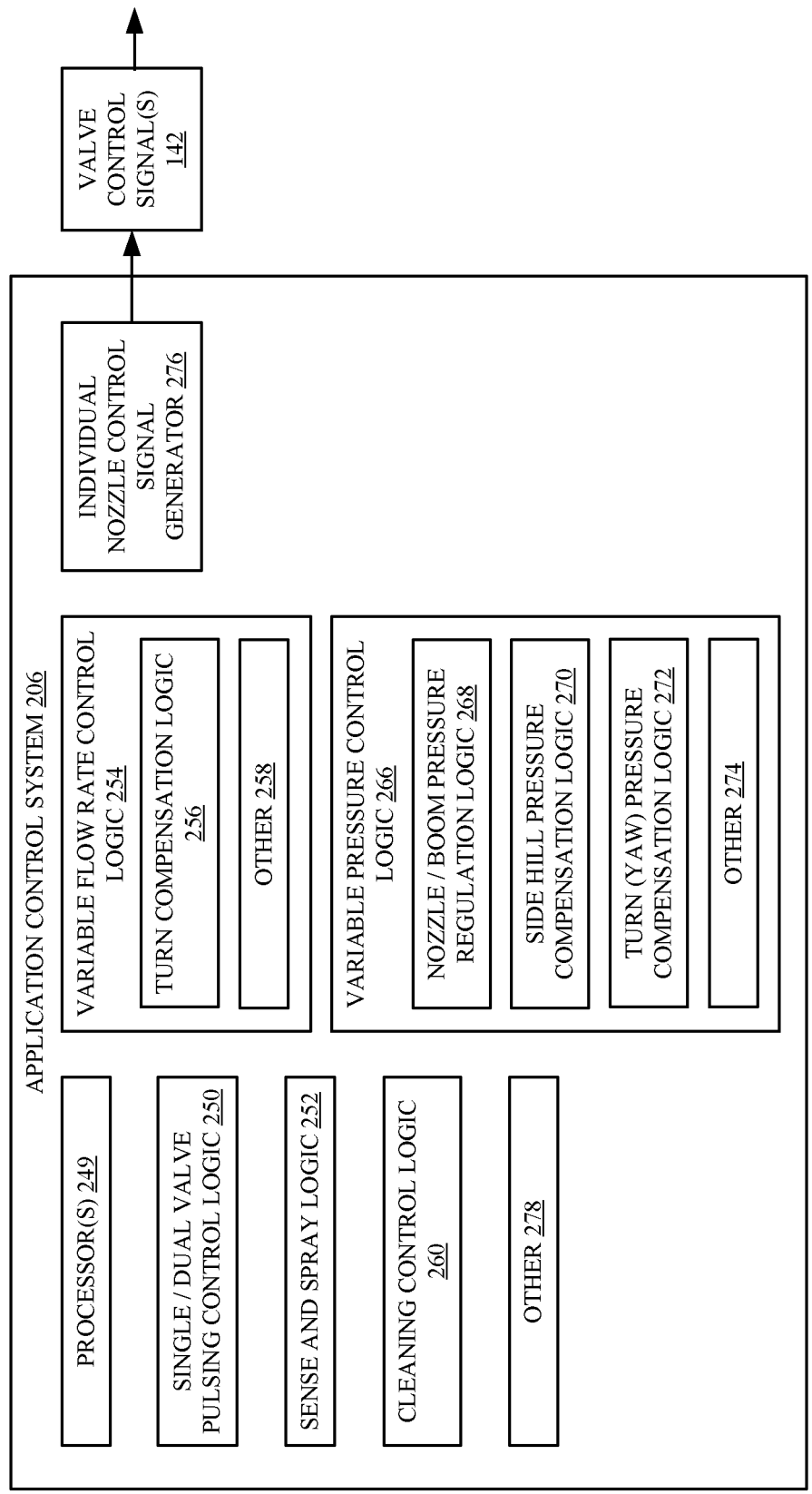
FIG. 6 is a block diagram showing one example of an application control system in more detail.

FIG. 6 shows a block diagram of one example of application control system 206 in more detail. In the example shown in FIG. 6, application control system 206 illustratively includes one or more processors 249, single/dual valve pulsing control logic 250, sense and spray logic 252, variable flow rate control logic 254 (which, itself, illustratively includes turn compensation logic 256 and other items 258), cleaning control logic 260, variable pressure control logic 262 (which, itself, can include nozzle/boom pressure regulation logic 268, side hill pressure compensation logic 270, turn (yaw) pressure compensation logic 272, and it can include other items 274), individual nozzle control signal generator 276, and it can include a wide variety of other items 278.

In one example, application control system 206 receives configuration inputs 204 (shown in FIG. 5) to set single/dual valve pulsing control for pulsing operation of valves 216-218. In single valve pulsing control, for instance, logic 250 may pulse a corresponding valve so that it applies the substance to be applied, only on seeds that have just been planted, or that were previously planted where the seed location is known. In such operation, pulsing control logic 250 can receive a seed sensor signal indicative of seed location and turns the valve off in between seeds which greatly conserves the amount of substance that is applied. In dual valve pulsing control, for instance, logic 250 may be used to control two valves, or to control a single valve for the application of multiple different substances. By way of example, it may be that two different substances cannot be mixed prior to application, because of their physical or chemical properties. Thus, they can be individually applied by using dual valve pulsing control.

Variable flow rate control logic 254 illustratively controls the flow rate of the substance to be applied through the valves by varying the valve position (e.g., the position of tip 128 of plunger 126 within valve housing 104). The flow rate can be varied, for instance, based upon the speed of machine 200. In addition, turn compensation logic 256 can vary the flow rate of individual nozzles, as the machine is turning. The speed and course of the machine can be determined based on sensed operator inputs or based on other sensor inputs from sensors 202. By way of example, when a sprayer turns in a field, the nozzles on the boom furthest to the outside of the turn will have a higher linear velocity relative to the surface of the ground, than those furthest inside on the turn. In that case, turn compensation logic 256 can use sensor inputs from sensors 202 indicating that machine 200 is turning in a certain direction. It can also obtain boom dimensions that are input or already stored. It can thus vary the flow rate through the different nozzles, along the boom, to achieve a relatively uniform application rate, even though the different nozzles are moving at different linear velocities relative to the surface of the ground. In one example, the turn down rate (the rate by which the maximum flow rate differs from the minimum flow rate) can be on the order of 20-1 using the valve assembly illustrated in the previous figures.

Variable pressure control logic 266 illustratively uses the inputs from pressure sensors 220-222 in order to control the valves 216-218 to accommodate pressure control. By way of example, it may be that the pressure of the substance to be applied may vary along the length of the boom, on a sprayer. Thus, nozzle/boom pressure regulation logic 268 can control the positions of the individual valves, for the individual nozzles along the boom, to accommodate for the change in pressure. By way of example, it may open the valves wider or close them more, to maintain a desired pressure across the nozzle.

Side hill pressure compensation logic 270 can also be used to compensate the valve position for variations in pressure due to operating on a side hill. By way of example, it may be that a sprayer is operating on a side hill and therefore the inlet pressure may be higher on the downhill inlets 106 than on the uphill inlets 106. Side hill pressure compensation logic 270 can sense this and compensate for the pressure variance using valve position. In one example, logic 270 can do this by using the signals from pressure sensors 220-222. In another example, logic 270 can receive topological a map indicating where side hills reside on the field being treated. It can also receive a geographic position signal indicating the geographic position and heading of machine 200 to determine that it is operating on a side hill. It can use a signal from a machine orientation sensor (such as an accelerometer or other sensor). All of these and other control algorithms are contemplated herein.

Turn (yaw) pressure compensation logic 272 can also compensate for variations in inlet pressure due to the machine 200 turning around. For instance, if a sprayer is turning around, it may be that the inlet pressure on the valves on the outside of the turn may be higher than those on the inside of the turn. This can be sensed by logic 272, and logic 272 can be used to control the valve positions on the boom to compensate for that pressure variation.

Sense and spray logic 252 can be used to sense an attribute indicative of a location where application of the substance to be applied is needed. For instance, if the substance to be applied is a herbicide, then sense and pray logic 252 may receive a sensor input from one of sensors 202 that may be a weed sensor. The weed sensor may be an optical sensor that captures an optical image ahead of a sprayer and uses image processing to identify weeds in that optical image. It can be a different sensor as well. Sense and spray logic 252 can then be used to generate a valve control signal to spray the weeds when the corresponding nozzle is over the weed. The same can be true where the substance to be applied is a fertilizer and the sensed plant to be sprayed is a crop plant. The location of the crop plants are sensed, (or stored from the planting or other previous operation) and when a crop plant is under the nozzle, the valve for the corresponding nozzle can be opened to apply the fertilizer, only where the plant is located. The same can be done with insecticide or other substances to be applied as well.

Cleaning control logic 260 can be used to vary the valve position between on and off, at a relatively high rate of speed, in order to clean the corresponding nozzles. Because the valve is a piezo-actuated valve, this can be done at high frequencies relative to solenoid driven valves.

It can thus be seen that a piezo-actuated valve can be used to provide significant advantages. It can be operated at a much higher rate than a solenoid driven valve. It can be used to accommodate a variable flow rate with a relatively high turn down ratio. It can be used, along with a pressure sensor, to generate pressure control (such as turn rate compensation and compensation for other pressure variations). It can be used to apply multiple different products or substances, even if they are not compatible (so that they cannot be mixed prior to application) because of the high rate at which the valve can be positioned between multiple positions. It can be used in sense and spray applications for crop plants, seeds, weeds, etc. This is also because it can be cycled on and off at a high enough frequency so that the seeds, plants and/or weeds can be recognized and the valves can be turned on and off in sufficient time to treat them as the vehicle moves along the field. It can also be used to accommodate relatively tight plunger position control. This can be used to control pressure for air induction nozzles, to control droplet size for pulse nozzles, and to improve cleaning operation.

The present discussion has mentioned processors and servers. In one examples, the processors and servers include computer processors with associated memory and timing circuitry, not separately shown. They are functional parts of the systems or devices to which they belong and are activated by, and facilitate the functionality of the other components, logic or items in those systems.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Example 1 is a mobile agricultural application machine, comprising:

a vehicle propulsion system;

a source of a substance to be applied to an agricultural field;

a spray nozzle;

a control signal generator that generates a valve control signal; and a piezo-actuated valve that receives the valve control signal and moves based on the valve control signal to apply the substance to be applied to the agricultural field through the spray nozzle.

Example 2 is the mobile agricultural application machine of any or all previous examples wherein the piezo-actuated valve comprises:

a piezo element configured to deform in response to application of the valve control signal; and a flexure, coupled to the piezo element, and configured top amplify deformation of the piezo element to provide a valve driving movement.

Example 3 is the mobile agricultural application machine of any or all previous examples wherein the piezo-actuated valve comprises:

a plunger having a proximal end coupled to the flexure and a distal end and configured to move reciprocally between a valve open position and a valve closed position as the flexure moves through the valve driving movement.

Example 4 is the mobile agricultural application machine of any or all previous examples wherein the piezo-actuated valve comprises:

a bellows having a distal end coupled to the distal end of the plunger with a liquid-tight connection and a proximal end fixed relative to reciprocal movement of the plunger.

Example 5 is the mobile agricultural application machine of any or all previous examples and further comprising:

a pressure sensor configured to sense a pressure of the substance to be applied and generate a pressure signal indicative of the pressure of the substance to be applied.

Example 6 is the mobile agricultural application machine of any or all previous examples wherein the control signal generator comprises:

variable pressure control logic configured to generate the valve control signal to control the piezo-actuated valve based on the pressure signal.

Example 7 is the mobile agricultural application machine of any or all previous examples wherein the spray nozzle comprises a plurality of different spray nozzles, and further comprising a plurality of different piezo-actuated valves, and, a separate pressure sensor corresponding to each of the plurality of different spray nozzles, each pressure sensor being configured to generate a separate pressure signal.

Example 8 is the mobile agricultural application machine of any or all previous examples wherein the variable pressure control logic comprises:

nozzle pressure regulation logic configured to generate a separate valve control signal to control each of the piezo-actuated valves based on the separate pressure signals.

Example 9 is the mobile agricultural application machine of any or all previous examples and further comprising a boom, wherein each of the plurality of different piezo-actuated valves is mounted at a different location along the boom and wherein the separate pressure sensors are configured to sense pressure at different locations along the boom, wherein the control signal generator comprises:

boom pressure regulation logic configured to generate a separate valve control signal to control each of the piezo-actuated valves based on the separate pressure signals indicative of the pressure at different locations along the boom.

Example 10 is the mobile agricultural application machine of any or all previous examples and further comprising a boom, wherein each of the plurality of different piezo-actuated valves is mounted at a different position along the boom and further comprising:

a turn sensor configured to sense when the machine is making a turn and generate a turn sensor signal indicative of the sensed turn; and turn pressure compensation logic configured to generate a separate valve control signal to control each of the piezo-actuated valves based on the turn signal and based on a position of each of the piezo-actuated valves along the boom.

Example 11 is the mobile agricultural application machine of any or all previous examples and further comprising a boom, wherein each of the plurality of different piezo-actuated valves is mounted at a different position along the boom and further comprising:

an orientation sensor configured to sense an orientation of the machine indicating that the machine is on a side hill and generate an orientation sensor signal indicative of the sensed orientation; and side hill pressure compensation logic configured to generate a separate valve control signal to control each of the piezo-actuated valves based on the orientation signal and based on a position of each of the piezo-actuated valves along the boom.

Example 12 is the mobile agricultural application machine of any or all previous examples wherein the spray nozzle comprises:

a plurality of different spray nozzles, each configured to spray a different substance to be applied to the agricultural field, and wherein the piezo-actuated valve is configured to control application of the plurality of different substances through the plurality of different nozzles.

Example 13 is the mobile agricultural application machine of any or all previous examples and further comprising:

a flow rate sensor configured to sense a flow rate of the substance through the valve, and wherein the control signal generator is configured to generate the valve control signal based on the sensed flow rate.

Example 14 is the mobile agricultural application machine of any or all previous examples and further comprising a boom, wherein each of a plurality of different piezo-actuated valves is mounted at a different position along the boom and further comprising:

a turn sensor configured to sense when the machine is making a turn and generate a turn sensor signal indicative of the sensed turn; and turn compensation logic configured to generate a separate valve control signal to control a flow rate through each of the piezo-actuated valves based on the turn signal and based on a position of each of the piezo-actuated valves along the boom.

Example 15 is an agricultural spray nozzle assembly, comprising:

a spray nozzle; and a piezo-actuated valve that receives a valve control signal and moves based on the valve control signal to control movement of a substance to be applied to an agricultural field through the spray nozzle.

Example 16 is the agricultural spray nozzle of any or all previous examples and further comprising:

a characteristic sensor configured to sense a characteristic of the substance to be applied and generate a characteristic signal indicative of the characteristic of the substance to be applied.

Example 17 is the agricultural spray nozzle of any or all previous examples wherein the characteristic sensor comprises at least one of a flow sensor sensing flow of the substance through the piezo-actuated valve or a pressure sensor sensing a pressure of the substance in the piezo-actuated valve.

Example 18 is a method of controlling a mobile agricultural machine to apply a substance to an agricultural field, the method comprising:

generating a valve control signal to control an agricultural spray valve on the mobile agricultural machine; and applying the valve control signal to a piezo actuator in the agricultural spray valve to control the agricultural spray valve.

Example 19 is the method of any or all previous examples wherein generating the valve control signal comprises:

sensing pressure of the substance in the agricultural spray valve;

generating a pressure signal indicative of the sensed pressure; and generating the valve control signal to control the piezo actuator in the agricultural spray valve on the mobile agricultural machine based on the pressure signal.

Example 20 is the method of any or all previous examples wherein generating the valve control signal comprises:

sensing flow of the substance through the agricultural spray valve;

generating a flow signal indicative of the sensed flow; and generating the valve control signal to control the piezo actuator in the agricultural spray valve on the mobile agricultural machine based on the flow signal.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claim

What is claimed is:

1. A mobile agricultural application machine, comprising:
a vehicle propulsion system;
a source of a substance to be applied to an agricultural field;
a spray nozzle;
a control signal generator that generates a valve control signal; and
a piezo-actuated valve that receives the valve control signal and moves based on the valve control signal to apply the substance to be applied to the agricultural field through the spray nozzle, the piezo-actuated valve comprising:
 a piezo element configured to deform in response to application of the valve control signal; and
 a flexure, coupled to the piezo element, and configured to amplify deformation of the piezo element to provide a valve driving movement.

2. The mobile agricultural application machine of claim 1 wherein the piezo-actuated valve comprises:
a plunger having a proximal end coupled to the flexure and a distal end and configured to move reciprocally between a valve open position and a valve closed position as the flexure moves through the valve driving movement.

3. The mobile agricultural application machine of claim 2 wherein the piezo-actuated valve comprises:
a bellows having a distal end coupled to the distal end of the plunger with a liquid-tight connection and a proximal end fixed relative to reciprocal movement of the plunger.

4. The mobile agricultural application machine of claim 1 and further comprising:
a pressure sensor configured to sense a pressure of the substance to be applied and generate a pressure signal indicative of the pressure of the substance to be applied.

5. The mobile agricultural application machine of claim 4 wherein the control signal generator comprises:
variable pressure control logic configured to generate the valve control signal to control the piezo-actuated valve based on the pressure signal.

6. The mobile agricultural application machine of claim 5 wherein the spray nozzle comprises a plurality of different spray nozzles, and further comprising a plurality of different piezo-actuated valves, and, a separate pressure sensor corresponding to each of the plurality of different spray nozzles, each pressure sensor being configured to generate a separate pressure signal.

7. The mobile agricultural application machine of claim 6 wherein the variable pressure control logic comprises:
nozzle pressure regulation logic configured to generate a separate valve control signal to control each of the piezo-actuated valves based on the separate pressure signals.

8. The mobile agricultural application machine of claim 6 and further comprising a boom, wherein each of the plurality of different piezo-actuated valves is mounted at a different location along the boom and wherein the separate pressure sensors are configured to sense pressure at different locations along the boom, wherein the control signal generator comprises:
boom pressure regulation logic configured to generate a separate valve control signal to control each of the piezo-actuated valves based on the separate pressure signals indicative of the pressure at different locations along the boom.

9. The mobile agricultural application machine of claim 6 and further comprising a boom, wherein each of the plurality of different piezo-actuated valves is mounted at a different position along the boom and further comprising:
- a turn sensor configured to sense when the machine is making a turn and generate a turn sensor signal indicative of the sensed turn; and
- turn pressure compensation logic configured to generate a separate valve control signal to control each of the piezo-actuated valves based on the turn signal and based on a position of each of the piezo-actuated valves along the boom.

10. The mobile agricultural application machine of claim 6 and further comprising a boom, wherein each of the plurality of different piezo-actuated valves is mounted at a different position along the boom and further comprising:
- an orientation sensor configured to sense an orientation of the machine indicating that the machine is on a side hill and generate an orientation sensor signal indicative of the sensed orientation; and
- side hill pressure compensation logic configured to generate a separate valve control signal to control each of the piezo-actuated valves based on the orientation signal and based on a position of each of the piezo-actuated valves along the boom.

11. The mobile agricultural application machine of claim 1 wherein the spray nozzle comprises:
- a plurality of different spray nozzles, each configured to spray a different substance to be applied to the agricultural field, and wherein the piezo-actuated valve is configured to control application of the plurality of different substances through the plurality of different nozzles.

12. The mobile agricultural application machine of claim 1 and further comprising:
- a flow rate sensor configured to sense a flow rate of the substance through the valve, and wherein the control signal generator is configured to generate the valve control signal based on the sensed flow rate.

13. The mobile agricultural application machine of claim 12 and further comprising a boom, wherein each of a plurality of different piezo-actuated valves is mounted at a different position along the boom and further comprising:
- a turn sensor configured to sense when the machine is making a turn and generate a turn sensor signal indicative of the sensed turn; and
- turn compensation logic configured to generate a separate valve control signal to control a flow rate through each of the piezo-actuated valves based on the turn signal and based on a position of each of the piezo-actuated valves along the boom.

14. An agricultural spray nozzle assembly, comprising:
- a spray nozzle; and
- a piezo-actuated valve that receives a valve control signal and moves based on the valve control signal to control movement of a substance to be applied to an agricultural field through the spray nozzle, the piezo-actuated valve comprising:
  - a piezo element configured to deform in response to application of the valve control signal; and
  - a flexure, coupled to the piezo element, and configured to amplify deformation of the piezo element to provide a valve driving movement.

15. The agricultural spray nozzle assembly of claim 14 and further comprising:
- a characteristic sensor configured to sense a characteristic of the substance to be applied and generate a characteristic signal indicative of the characteristic of the substance to be applied.

16. The agricultural spray nozzle assembly of claim 15 wherein the characteristic sensor comprises at least one of a flow sensor sensing flow of the substance through the piezo-actuated valve or a pressure sensor sensing a pressure of the substance in the piezo-actuated valve.

17. A method of controlling a mobile agricultural machine to apply a substance to an agricultural field, the method comprising:
- generating a valve control signal to control an agricultural spray valve on the mobile agricultural machine; and
- applying the valve control signal to a piezo actuator in the agricultural spray valve to control the agricultural spray valve, wherein applying the valve control signal to the piezo actuator comprises:
- deforming a piezo element; and
- amplifying the deformation of the piezo element, with a flexure coupled to the piezo element, to provide a valve driving movement.

18. The method of claim 17 wherein generating the valve control signal comprises:
- sensing pressure of the substance in the agricultural spray valve;
- generating a pressure signal indicative of the sensed pressure; and
- generating the valve control signal to control the piezo actuator in the agricultural spray valve on the mobile agricultural machine based on the pressure signal.

19. The method of claim 17 further comprising:
- sensing an orientation of the machine indicating that the machine is on a side hill and generating an orientation sensor signal indicative of the sensed orientation; and
- wherein generating the valve control signal to control the piezo actuator in the agricultural spray valve on the mobile agricultural machine is based on the orientation signal.

20. The method of claim 17 further comprising:
- sensing the machine is making a turn and generating a turn sensor signal indicative of the sensed turn; and
- wherein generating the valve control signal to control the piezo actuator in the agricultural spray valve on the mobile agricultural machine is based on the turn sensor signal.

21. The method of claim 17 wherein generating the valve control signal comprises:
- sensing flow of the substance through the agricultural spray valve;
- generating a flow signal indicative of the sensed flow; and
- generating the valve control signal to control the piezo actuator in the agricultural spray valve on the mobile agricultural machine based on the flow signal.

\* \* \* \* \*